United States Patent [19]

Garmany

[11] 4,276,552
[45] Jun. 30, 1981

[54] AUTOMATIC SYNCHRONIZATION FOR RECEIVERS OF A NAVIGATIONAL SYSTEM

[75] Inventor: William J. Garmany, Livingston, N.J.

[73] Assignee: International Telephone and Telegraph Corporation, New York, N.Y.

[21] Appl. No.: 973,320

[22] Filed: Dec. 26, 1978

[51] Int. Cl.³ .............................................. G01S 1/30
[52] U.S. Cl. .................................................. 343/105 R
[58] Field of Search ........................... 343/103, 105 R

[56] References Cited

U.S. PATENT DOCUMENTS

| 3,789,408 | 1/1974 | Ichihara et al. | 343/105 R |
|---|---|---|---|
| 3,852,751 | 12/1974 | Wood et al. | 343/105 R |
| 3,890,619 | 6/1975 | Mounce | 343/105 R |
| 3,900,876 | 8/1975 | Tsukada et al. | 343/105 R |

Primary Examiner—T. H. Tubbesing
Attorney, Agent, or Firm—John T. O'Halloran; Alfred C. Hill

[57] ABSTRACT

An essentially worldwide navigational network (Omega) operating at a very low frequency in an internationally allocated navigational band in the electromagnetic spectrum is provided with a receiver capable of automatic synchronization. The RF signal is detected by counting the cycles in the output of the signal tracking means in a preset short time interval and comparing the count to a threshold value. Automatic receiver synchronization synchronizes the intervals generated in the receiver with the received signals. Logic circuitry shifts the timing in Omega to relate the receiver segment timing with the detected signals.

12 Claims, 2 Drawing Figures

AUTOMATIC SYNCHRONIZATION FOR RECEIVERS OF A NAVIGATIONAL SYSTEM

BACKGROUND OF THE INVENTION

Omega is an accurate all-weather, global electronic navigational system. Omega supplies the navigational information regardless of weather or time of day, by providing very low frequency continuous pulsed wave transmissions to ships in any sea, land, or air vehicles anywhere. This system is available to both military and civilian users and all nations. In this connection, the system is being installed on all U.S. Naval surface ships capable of independent operation as a general purpose all weather electronic aid to navigation. Fishing boats and merchant ships have also been equipped with this system.

The Omega navigational system utilizes phase-difference measurement techniques for navigation. This system contemplates eight transmitter locations such that a ship or aircraft anywhere in the world will be within range of at least 3 and probably 4 transmitters. Each station transmits Omega signals on a time-share basis, when no other station is on the air, and time shared frequencies in the 10 to 14 KHz band. In practice, the fundamental measurement in Omega is the phase of the 10.2 KHz signal from each of the several stations. The 10.2 KHz transmission at each station lasts approximately 1 second and is repeated each 10 seconds.

The receiver measures the phase of the 10.2 KHz signal from a selected transmitter in comparison with the signal from a second station. The phase difference establishes a line of position (LOP) on an Omega chart. Another pair of stations provide a second line of position, establishing a fix.

Omega receivers in use today are simple to operate with a numerical readout displaying continuously the Omega coordinates of the vehicle's position based on the phase difference of received signals. Omega receiving systems model numbers AN/SRN-14 and AN/BRN-4 were manufactured by Avionics Division ITT, Nutley, N.J. 07710.

In the Omega navigational system, signals are transmitted in a format that is repeated at 10 second intervals. All navigational signals are transmitted during 8 segments that are 0.9 to 1.2 seconds long with 0.2 second spacing. The 10 second format with eight 0.2 second OFF intervals is generated in an Omega receiver. Successful search consists of synchronizing the format generated in the receiver with that of the received signals. However, the synchronization is rendered difficult because of the following factors:

1. Low cost Omega receivers operate on 10.2 KHz only.
2. Only some of the 8 stations will be received at any time.
3. Noise and weak signals will give false indications of signal absence.
4. The response of narrow-band filters to noise will cause false indications of signal presence.
5. The Omega segment format has a poor autocorrelational factor, rendering the received signal pattern ambiguous under noise conditions.

Thus, the search problems may be divided into two areas, namely, (i) satisfactory detection of Omega RF signals under adverse conditions, and (ii) a technique for relating the receiver segment timing with the detected signals.

In Omega navigational receiving systems heretofore proposed, synchronization has been achieved manually. Within the recent past a computer controlled correlation technique for achieving synchronization has also been proposed. Manual synchronization is time consuming and inaccurate. The correlation technique requires the use of an expensive general purpose computer.

SUMMARY OF THE INVENTION

It is a principal object of the present invention to overcome the drawbacks and disadvantages of the prior art by providing an improved technique for detecting the Omega RF signal and for automatic Omega receiver synchronization of the intervals generated in the receiver with the received signals.

OMEGAL SIGNAL DETECTION

In accordance with the present invention the presence of Omega signals can thus be detected by counting the cycles in the output of a hard-limited amplifier (normally part of Omega tracking circuits) in a short interval and comparing the count to a threshold value. The count will exceed the threshold when no Omega signals are present. Statistical analysis shows that lengthening the counting intervals will reduce the probability of a false indication, that is, a count above the threshold, when signals are present or below the threshold when no Omega signals are present. A counting interval or cycle of 0.1 second has been selected because it is the largest periodic interval that can be coherent with the Omega signal format. A threshold can be found which will minimize the errors in detection. Thus, a reliable detection system has been developed to provide a logic signal that indicates the presence of a received Omega signal.

SEARCH TECHNIQUE

Omega search consists of matching the receiver's Omega signal format to the detected Omega signals. In accordance with the present invention the proposed search scheme consists of changing timing of the standard Omega signal format generated in the receiver to achieve and maintain correct synchronization with received signals. The timing changes will be made according to the invention only at 0.1 second intervals because the detection scheme will indicate signal presence or absence in 0.1 second intervals.

For convenience, an indication of signal presence during an interval of 0.1 second will be called a "hit" and signal absence, a "miss."

Timing changes will be made in accordance with the following three rules for comparing the detector signal with the Omega format generated in the receiver:

1. If a hit occurs in the first half of any 0.2 second OFF interval, set the receiver's clock back 0.1 second by inhibiting one 0.1 second timing pulse.
2. If two misses and 8 consecutive hits occur within any one Omega signal segment, set the receiver's clock back 0.1 second by inhibiting one 0.1 second pulse.
3. If a hit occurs in the second half of any 0.2 second OFF interval, set the receiver's clock ahead 0.01 second by adding a 0.01 second timing pulse.

The first rule provides the principal means of shifting the receiver's clock to the correct time. A series of hits will hold the clock at the first half of an OFF interval until the miss is detected.

The second rule is used to breakaway from incorrect synchronization where some detected signals are of shorter duration than the receiver time segments during which they are detected.

The third rule is used to break out of certain false-lock situations, to achieve correct accuracy of synchronization, and to provide a method of returning to the correct synchronization point if it is overshot by application of the first and second rules. The correct synchronization point would not be overshot if the detection process were to work perfectly, however, occasional false detector outputs such as a false hit during the first half of actual off-time could set the receiver's clock back 0.1 second. In this case the leading edge of each received signal will occur during the second half of the receiver's OFF interval and a timing correction will occur under the third rule. The normal 0.1 second counting intervals will be reduced to 0.09 seconds each time the third rule is applied. The resulting low cycle count could result in a false indication of a "hit." This is of little consequence because it will normally occur during the second 0.1 second interval of an actual received Omega segment.

It has been found that correct synchronization is attainable within three minutes under practical operating conditions. Incorrect synchronization is avoided with any combination of three received stations and many combinations of only two stations. A small percentage of random detection errors will slow the search process but not stop it. After synchronization, such errors may cause some minor change in the synchronization point without effecting the Omega phase difference measurements. The automatic synchronization technique of the present invention requires no attention by the operator and will cost much less than the computer needed to effect the correlation method

AUTOMATIC SEARCH CUT-OFF

The proposed Omega receiver design will include a circuit to cut off the operation of the automatic search logic after synchronization has been achieved. This will be done by a counter which disables the search logic after a predetermined number of 10-second intervals pass without search rule being applied.

Other objects and advantages will become apparent from the following detailed description which is to be taken in conjunction with the accompanying drawings.

BRIEF DESCRIPTION OF THE DRAWINGS

In the drawings, the figures represent a schematic block diagram of the system used for automatic synchronization of Omega receivers, FIG. 1 to be aligned on the right of FIG. 2.

DETAILED DESCRIPTION

Figure 1:
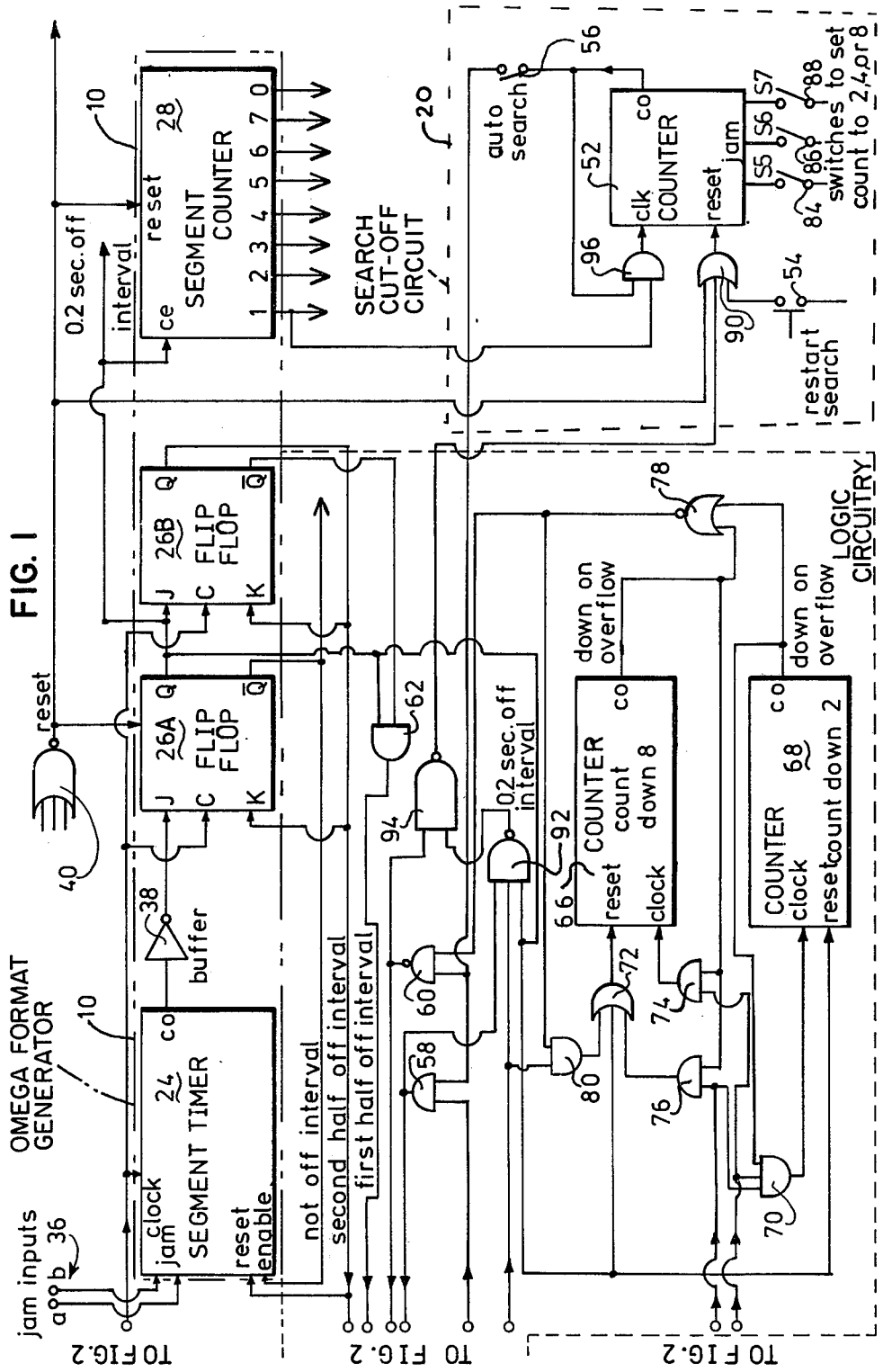
Figure 2:
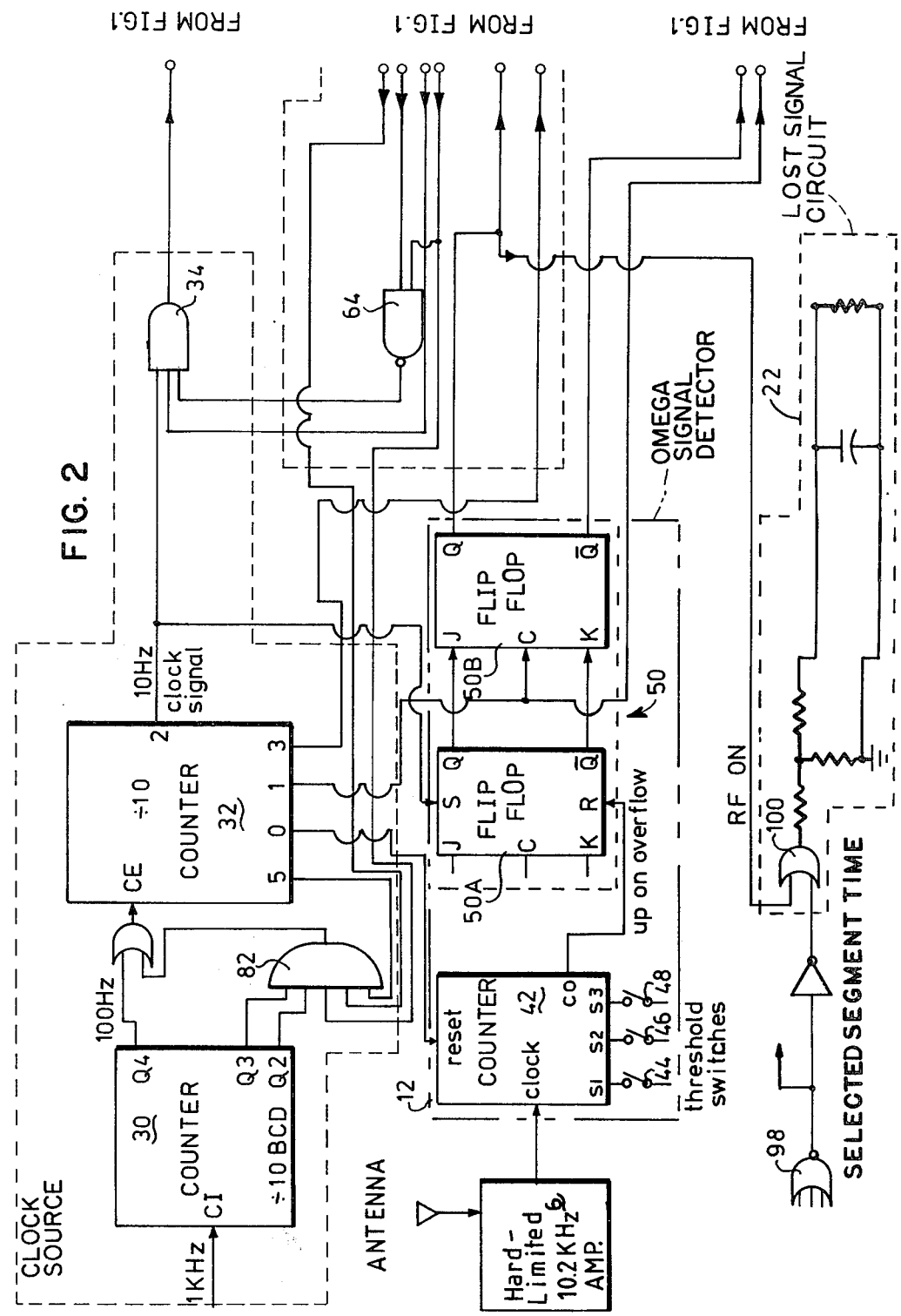

In the drawings the automatic synchronization system for Omega receivers will include an Omega format generator 10 and an Omega signal detector 12, one logic circuitry (to be described) as well as an automatic search cut-off circuit 20 and lost signal indication circuit 22.

OMEGA FORMAT GENERATOR

The Omega format generator 10 includes integrated circuits 24, 26 and 28 used to generate the Omega transmission format. These integrated circuits are driven by a 10 Hz clock signal that is divided down from a 1 KHz signal by counters 30 and 32. The 10 Hz signal is normally passed through the AND gate 34. Counter 24 times each Omega segment of 0.9, 1.0, 1.1 or 1.2 seconds, the specific time depending upon the states of two jam inputs 36A and 36B. The output of counter 24 (which goes low when the count is reached) is inverted by buffer 38 and applied to flip-flop 26A. Flip-flops 26A and 26B, clocked by the 10 Hz signal, time the 0.2 second OFF interval. Counter 24 is disabled during this interval by the absence of a $\overline{Q}$ output from 26A and is reset by the Q output from 26B.

Counter 28 is clocked by the OFF interval from the Q output of flip-flop 26A. The 8 outputs of segment counter 28 are high one at a time in sequence, corresponding to the 8 Omega segments. Selected outputs of counter 28 are gated to generate the jam inputs for counter 24. The gate 40 provides a reset signal for the Omega logic.

OMEGA SIGNAL DETECTOR

Omega signals received from a hard-limited amplifier 6 are applied to the clock input of counter 42. The output of the amplifier may also be provided to a phase comparison circuit. Several switches, such as switches 44, 46 and 48 permit setting of the count threshold at an optimum value between 1024 and 1400. The optimum value is approximately 1080.

When a 10.2 KHz Omega signal is received, the number of cycles counted in the 0.1 second interval will be below the selected threshold and the output will remain low. When no 10.2 KHz signal is received during much or all of the 0.1 second interval, the count threshold will be exceeded. The output of counter 42 will then go high and reset flip-flop 50A.

Counter 32 provides output signals sequentially on separate lines each 0.01 second. The 0 output of counter 32 resets counter 42. The 1 output of counter 32 transfers the state of flip-flop 50A to flip-flop 50B, then the 2 output of counter 32 sets flip-flop 50A. The Q output of flip-flop 50B is thus high only when an Omega signal was received during the preceding 0.1 second interval.

OMEGA SEARCH

Counter 52 provides a high output signal after being reset by switch 54 or by gate 40. When switch 56 is closed, this signal is applied to gates 58 and 60, and timing changes will be made according to the three Omega search rules that were listed in the foregoing.

RULE NO. 1 LOGIC

The output of AND gate 62 is high only during the first half of the 0.2 second OFF interval. If the Q output of flip-flop 50B is high at this time (indicating the presence of a 10.2 KHz Omega signal) NAND gate 64 will have a low output and block the 10 Hz timing signal at AND gate 34. This will hold the Omega format timing at the first half of the OFF interval until the absence of a 10.2 KHz Omega signal causing flip-flop 50B to transfer. The Q output of the flip-flop 50B will then go low and gate 64 will provide a high signal to gate 34, permitting Omega timing to be resumed.

RULE NO. 2 LOGIC

Counters 66 and 68 are held in the reset mode by the OFF interval signal from the Q output of flip-flop 26A, hence they can count only during an Omega segment. AND gate 70 passes 10 Hz clock pulses from counter 32 to counter 68 when there is no 10.2 KHz Omega signal as indicated by a high level on the $\overline{Q}$ output of flip-flop 50B. When two counts are received, the output of counter 68 goes low, blocking further counting at gate 70.

Counter 66 is also advanced by the same 10 Hz clock signal from counter 32, however, it is reset by OR gate 72 each time the $\overline{Q}$ output of flip-flop 50B is high, indicating no 10.2 KHz Omega signal. It is therefore necessary to have eight consecutive clock pulses with an Omega signal being received to complete the count in counter 66. When this happens, additional clock pulses are inhibited by AND gate 74, and reset by flip-flop 50B is inhibited by AND gate 76.

When both counters 66 and 68 complete their counting, the output of NOR gate 78 goes high. The output of NAND gate 60 then goes low, inhibiting one Omega format clock pulse from the 2 output of counter 32. The following pulse on the 3 output of counter 32 resets counter 66 through gates 80 and 72 so that only one clock pulse is inhibited.

RULE NO. 3 LOGIC

The Q output of flip-flop 26B is high only during the second half of the OFF interval. If the Q output of flip-flop 50B is high at this time (indicating the presence of a 10.2 KHz Omega Signal) AND gate 82 will provide an extra clock pulse to counter 32 when the Q2 and Q3 outputs of counter 30 and the 5 output of counter 32 coincide. This will result in advancing the output signals of counter 32 0.01 second. Applying the 5 output of counter 32 to gate 82 permits only one extra timing pulse in a 0.01 second interval. Thus only one extra pulse can be inserted in each OFF interval.

AUTOMATIC SEARCH CUT-OFF

Counter 52 is clocked at 10 second intervals by one output of the Omega segment counter 28. Switches, such as switches 84, 86 and 88, permit setting the counted time between 10 and 100 seconds. OR gate 90 permits reset by a reset button 54, by the gate 40 reset signal, or by application of any of the time shift rules. The presence of a 10.2 KHz Omega signal during the 0.2 second OFF interval (Rules 1 and 3) will reset counter 52 through NAND gates 92 and 94. The coincident overflow of counters 66 and 68 (Rule 2) will reset counter 52 through gates 78, 60 and 94.

When Omega synchronization has been achieved, no timing corrections will occur for several 10 second periods, permitting counter 52 to reach its preset threshold. Its output signal will then go low, inhibiting further clocking by AND gate 96 and further timing shifts by gates 58 and 60. These two gates also prevent signals from the time-shift logic from resetting counter 52. Omega search may be restarted manually by pressing button 54.

LOST SIGNAL INDICATION

The output of gate 98 is high only during the Omega segments selected for tracking. The output of OR gate 100 is therefore high except when 10.2 KHz RF is not present during the selected Omega segments. This signal is used to operate lost signal indicator lamps through circuits with appropriate time constants.

SUMMARY

Thus the several aforenoted objects and advantages are most effectively attained. Although a single and somewhat preferred embodiment has been disclosed and described in detail herein, it should be understood that this invention is in no sense limited thereby and its scope is to be determined by that of the appended claims.

What is claimed is:

1. A synchronization arrangement for a receiver of an essentially worldwide navigational network comprising:
   first means to receive navigational signals from said network having a predetermined format;
   second means to generate timing signals having said predetermined format;
   counting means coupled to said first and second means to provide a count of signals at an output of said first means in a prescribed short time interval and to provide a high logical output when a predetermined count threshold has been exceeded, said high logical output indicating the absence of said navigational signal; and
   logic circuitry coupled to said second means and said counting means responsive to said high logical output and certain other conditions to shift the timing of said second means to synchronize said timing signals to said received navigational signals.

2. An arrangement according to claim 1, wherein said second means includes
   a first counter and a second counter coupled to each other to divide an input reference signal having a first given frequency to provide a clock signal having a second given frequency less than said first given frequency,
   a segment timer coupled to said second counter,
   a first pair of bistable circuits coupled to each other, said segment timer and said second counter, and
   a segment counter coupled to said first pair of bistable circuits and to said segment timer to provide said predetermined format including in each of 10 second repeated time intervals, eight navigational time intervals each being 0.9 to 1.2 seconds long and eight 0.2 second OFF intervals each being disposed between different adjacent ones of said navigational time intervals.

3. An arrangement according to claim 2, wherein certain outputs of said second counter are coupled to said counting means.

4. An arrangement according to claim 3, wherein said counting means includes
   a third counter having an output, a clock input coupled to the output of said first means, and a reset input coupled to one of said certain outputs of said second counter to provide said prescribed time interval at 0.1 seconds,
   a second pair of bistable circuits coupled to each other, said third counter and said second counter, a first of said second pair of bistable circuits being reset by said high logic output at the output of said third counter and set by said clock signal and the second of said second pair of bistable circuits being clocked by another of said certain outputs of said second counter, and
   switching means coupled to said third counter to select said predetermined count threshold between a count of 1024 to 1400.

5. An arrangement according to claim 4, wherein said switching means comprises means to select said count threshold at approximately a count of 1080.

6. An arrangement according to claim 5, wherein said logic circuitry comprises means for retarding the timing of said second means at 0.1 second intervals when said high logical output is absent at the output of said third counter and when given ones of said certain other conditions are present.

7. An arrangement according to claim 6, wherein said logic circuitry includes first logic means coupled to said first pair of bistable circuits and said second pair of bistable circuits to produce a first inhibiting signal when the presence of said navigational signal is detected in the first half of any one of said OFF intervals, and first gate means coupled to said first logic means and between said second counter and said segment timer responsive to said first inhibiting signal to inhibit one 0.1 second timing pulses at the output of said second counter each time said first inhibiting signal occurs.

8. An arrangement according to claim 7, wherein said logic circuitry further includes second logic means coupled to said first pair of bistable circuits, a predetermined output of said second counter, said second pair of bistable circuits and said first gate means to produce a second inhibiting signal when said navigational signals are not detected in two 0.1 second intervals and said navigational signals are detected in eight consecutive 0.1 second intervals within any one of said repeated time intervals, said second inhibiting signal inhibiting one 0.1 second timing pulses in said first gate means when it occurs.

9. An arrangement according to claim 8, wherein said logic circuitry comprises means for advancing the timing of said second means at 0.01 second intervals when said high logical output is absent at the output of said third counter and when other ones of said certain other conditions are present.

10. An arrangement according to claim 9, wherein said logic circuitry further includes a second gate means having an output coupled to said second counter and inputs coupled to predetermined outputs of said first counter, to a selected output of said second counter, said second pair of bistable circuits and said first pair of bistable circuits to add an additional 0.01 second timing pulse to the input of said second counter every time said navigational signals are present in the second half of said OFF interval.

11. An arrangement according to claim 1, further including cut-off means coupled to said second means and said logic circuitry to stop said shifting of said second means when synchronization is achieved.

12. An arrangement according to claim 1, further including indicator means coupled to said counting means and said second means to indicate an absence of detected signals during selected time intervals.

* * * * *